(No Model.)
E. L. BARBER.
Water Cooler.
No. 236,529. Patented Jan. 11, 1881.
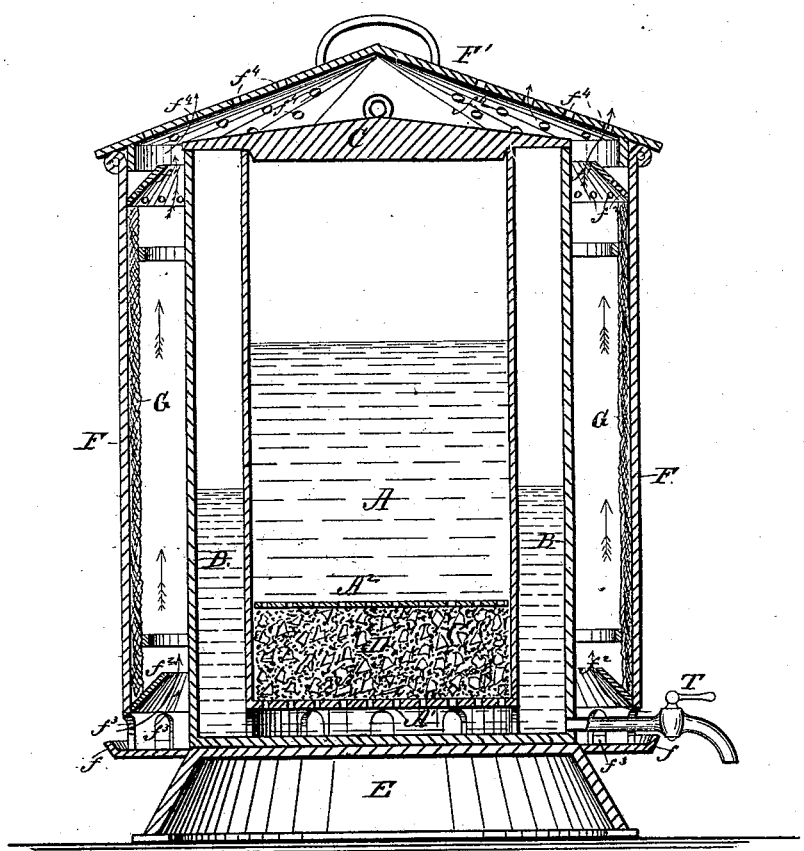
WITNESSES:
INVENTOR:
E. L. Barber
BY
ATTORNEYS.

UNITED STATES PATENT OFFICE.

EDWIN L. BARBER, OF HENRIETTA, TEXAS.

WATER-COOLER.

SPECIFICATION forming part of Letters Patent No. 236,529, dated January 11, 1881.

Application filed October 20, 1880. (No model.)

*To all whom it may concern:*

Be it known that I, EDWIN L. BARBER, of Henrietta, in the county of Clay and State of Texas, have invented a new and Improved Water-Cooler; and I do hereby declare that the following is a full, clear, and exact description of the same.

My invention relates to an improvement in water-coolers wherein the vessel for holding the water is surrounded with a fibrous material that is kept saturated with water, the evaporation of which will absorb the heat from the water contained in the vessel in a manner well known to science; and the improvement consists in providing an outer casing for the water-vessel that is provided with openings at the base and cover of the casing, and in covering the inside of the casing with felt, and also in providing troughs at the upper and lower edges of the felt to supply it with water and catch the drip therefrom, by which means a draft of air will be caused to pass through the inclosed space around the water-vessel in an effectual manner, as will hereinafter appear.

The accompanying drawing represents a vertical central section through a water-cooler constructed according to my invention.

The cooler may be, and is preferably, provided with two water-vessels, A B, one arranged within the other and both covered by a single cap, C. The inner vessel, A, is formed with a perforated bottom, A', and a perforated diaphragm, A², arranged above it, the space D between them being filled with suitable filtering material. The diaphragm A² may rest loosely upon the filtering material, so that the weight of the water in the vessel A will serve to pack and hold the material in place, the bottom A' of the vessel A being raised a sufficient distance above the bottom of the vessel B to allow the water to pass from the inner to the outer material.

A suitable base, E, is provided, upon which the water-vessels may rest, and around the rim of which the lower portion of a casing, F, may be secured that surrounds the outer vessel, B, so that an annular space may be left between them upon the sides and also over the cover of the water-vessels. The lower edge, $f$, of the casing may be turned up to hold any water that may drip or overflow into it, and inner flanges, $f'$ and $f^2$, the one arranged at the bottom and the other at the top and upon the inner side of the casing F, to form annular troughs around it. The upper flange, $f'$, is formed with small perforations $f^2$, through which water may slowly percolate from the upper trough, and an absorbent lining, G, of felt, flannel, or other suitable material, is made to line the inner wall of the casing between the troughs, and the water flowing from the upper trough saturates the lining and drips into the lower trough, which latter trough serves the purpose of catching the surplus water that drips from the lining G and holds it in contact with the bottom of said lining, in order that the same may be kept moist in case the supply of water at the top is not continuous.

The lower portion of the casing F is provided with openings $f^3$ around it to admit the outer air into the space between the casing and water-vessel, and similar openings $f^4$ are made in the cover F' of the casing. The air will enter the lower openings and absorb the heat from the water held in the lining G and pass off through the upper openings, $f^4$. The space between the casing and water-vessels will thus be cooled, and the water in the vessels thereby reduced in temperature to a corresponding degree.

By attaching the felt to the inside of the casing, instead of the outside of the water-vessel, it will be seen that the influence of the warm air surrounding the casing will not be allowed in so great a degree to counteract the cooling of the water-vessel, for in this case the current of cooled air passing up through the air-chamber between the evaporating-surface and the water-vessel will be allowed to act only upon the water-vessel, and the heat in said vessel will be more rapidly carried off. In case a covering of felt is attached to the outside of the water-vessel also, an advantage will be gained in the increase of evaporating-surface.

When the water-vessels are used a small bulk of water at a time is exposed to be cooled for use, as the water in the annular space between the vessels is separated from the main bulk of water in the inner vessel. Suitable spigots, T, may be connected to the water-space between the vessels A B, and the inner water-vessel may be made removable from the outer one, so that the filtering material and interior of the vessels may be cleansed. The lining around the inside of the casing may be held in place by metal or wooden hoops, or in any other simple manner.

I am aware that a water-cooler having an interior vessel provided with a filter at its bottom is not new, and also that a moistened lining of felt or similar material for providing an evaporating-surface has before been used. I therefore do not claim such features as of my invention, nor do I claim the troughs for supplying water to the felt; but

What I claim as new, and desire to secure by Letters Patent, is—

The casing F, having perforations $f^3$ at the bottom and $f^4$ at the top to allow a current of air to pass upward around the cooler, and provided with a porous lining, G, to form an evaporating-surface on the outer side of said current of air, substantially as and for the purpose specified.

EDWIN LOUIS BARBER.

Witnesses:
A. K. SWANN,
F. E. McGAUGHEY,
P. M. STINE.